July 25, 1933.   J. N. WHITEHOUSE   1,919,918
MOLDING AND PRESSING METHOD AND APPARATUS
Filed July 5, 1929
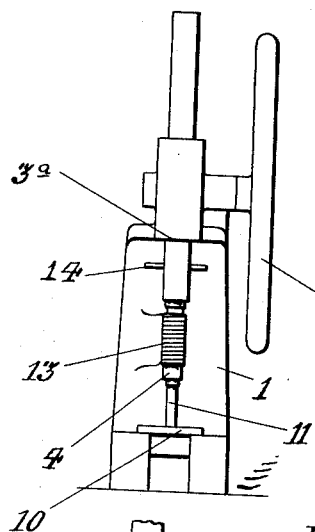
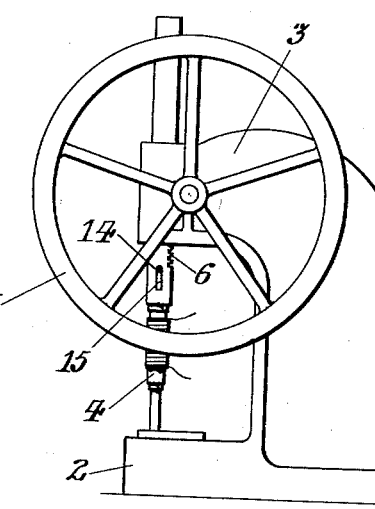
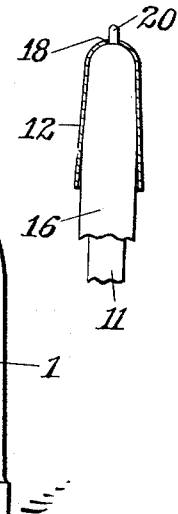
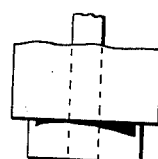
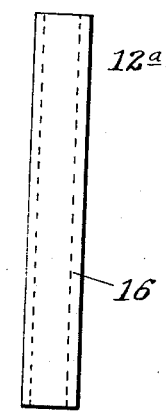
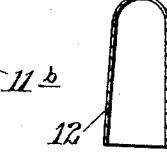
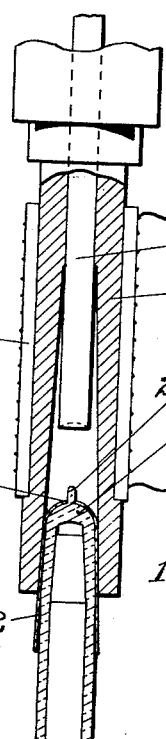
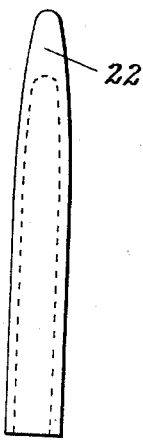
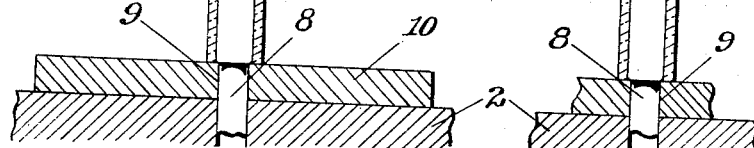
INVENTOR:
JOHN N. WHITEHOUSE,
By Frank J. Hent
Attorney Patented July 25, 1933

1,919,918

UNITED STATES PATENT OFFICE

JOHN N. WHITEHOUSE OF NEW YORK, N. Y., ASSIGNOR TO SANITE CORPORATION, OF BURLINGTON, NEW JERSEY, A CORPORATION OF NEW JERSEY

MOLDING AND PRESSING METHOD AND APPARATUS

Application filed July 5, 1929. Serial No. 376,084.

My invention relates to new and improved methods and apparatus for molding or shaping articles or materials which become plastic when heated, such as hard rubber and celluloid, hereafter referred to for convenience as "heat-plastic" material.

A principal object is to form closer and/or specially shaped ends on cylindrical tubes of the heat-plastic material, as for example in producing bodies, reservoirs, or caps for fountain pens, etc.

A more particular object is to expedite and otherwise improve present processes by enabling the article to be quickly removed from the forming mechanism; and this is accomplished principally by the provision and proper use of a device in the nature of a "forming cap" or thimble.

Since only one end portion of the tube requires reshaping, the invention provides for softening, by heating, only such end portion, while the remainder of the tube remains unheated and "hard", and pressing or shaping the heated and plastic end portion to the desired form. Provision is made, by the use of proper forming thimbles, and otherwise, for the production of various special end formations, including closed ends, or open ends (as when the closure of the end is to be completed by insertion of a plug), and in either case to produce various externally tapered or rounded end formations.

The characteristics and advantages of the invention are further sufficiently explained in connection with the following detail description of the accompanying drawing, which shows representative embodiments. After considering these examples, skilled persons will understand that many variations may be made without departing from the principles disclosed and I contemplate the employment of any structures or methods that are properly within the scope of the appended claims.

In the drawing:

Fig. I is a front elevation of a press, embodying the apparatus of the invention in one form.

Fig. II is a side elevation.

Fig. III is a vertical section of the heating and pressing elements.

Fig. IV shows another operative position thereof with the components slightly modified.

Fig. V is a side view of a tube of heat-plastic material, ready for the shaping operations.

Fig. VI shows a tubular former, or forming cap, in section.

Fig. VII is a similar view of a modified device of the same kind.

Fig. VIII is a side view of the completed article in one form.

Fig. IX shows a forming cap for the production of the article of Fig. VIII.

Fig. X shows a modified forming cap and lower plunger.

The press (Figs. I and II) includes a yoke frame 1, base 2, arm 3, tubular upper plunger 4 arranged to reciprocate therein, hand wheel 5, rack 6 and a gear (not shown) for operating plunger 4, a central upper plunger or ejector 7 reciprocable within the tubular plunger, and a lower plunger or mandrel 11 mounted on the base, or on a plate 10 thereon, as by providing the mandrel with a dowel 8 inserted in a hole 9 in the base, or in plate 10.

An electric heating coil 13 with proper circuit connections and control is located about the tubular plunger.

Inner plunger 7 may be operated in any suitable way, as by a rod 14 passing through slots 15 in the tubular plunger.

A forming cap or thimble 12 Figs. III and VII (and also shown in other forms in Figs. VI, IX and X) is placed in the generally tapered lower portion of the hollow plunger 4.

Upper portions of mandrels 11 are shaped to give the desired form to the upper, interior parts of the molded article, and the forming cap is shaped to produce the desired external form.

Fig. V shows a heat-plastic tube 16 of hard rubber, celluloid, or other material capable of being softened by heat and pressed or molded by the present apparatus and method.

If of celluloid, the tube may have a "solid" or homogeneous wall structure, or it may be of the type which is produced by winding a celluloid sheet, with a solvent, about a mandrel, and in such cases may have any of various distinctive or decorative "patterns", or opalescent or other attractive appearance due to translucence, etc.

A tube 16 is placed about the mandrel 11, resting on the press base, or plate 10 thereon. The hollow plunger 4 with forming cap 12 in place as shown, is then brought down to engage the lower portion of the cap about the upper part of tube 16. The plunger is heated to desired temperature by coil 13, and this heat is applied through cap 12 to the upper portion of the tube 16, which is made plastic, while the lower portion of the tube is cool and hard, so that there is no risk of deformation of the tube, except such portion as is to be reshaped, as would be likely to occur if the entire tube were heated and softened. In the continued downward movement of the plunger and cap, the material of the tube end is forced to flow upward, and as the plunger and cap 12 reach final position (Fig. IV) the plastic material fills the space between the mandrel and the cap, forming a more or less tapered, closed and rounded end 17, with interior form corresponding to the shape of the mandrel.

To permit escape of entrapped air the top of the thimble 12 may have a small vent-hole 18; and in order to insure filling of the space between the mandrel and cap, and correct and uniform shaping of inner and outer surface of the molded article, downward movement of the thimble may be continued until a certain excess amount of the plastic is extruded through the vent, as at 20 Fig. X. This vent hole, and the extrusion of material, may be omitted in some cases.

Plunger 4 is then withdrawn upward, leaving the forming thimble on the tube end; in a preferred mode of operation, the thimble is retained by friction in the tapered bore of the plunger, and thus tube 16 is drawn upward away from mandrel 11, and finally the thimble is ejected from the plunger by action of ejector 7, the thimble remaining in position about the plastic tube end until the latter cools and hardens in proper form. The thimble is then removed, and the projecting portion or tit 20 produced by extrusion is trimmed off and the tube otherwise "finished" as desired.

Ejection of the thimble may be effected by "hand" actuation of rod 14 connected by the ejecting plunger 7, or in the upward movement of plunger 4, the rod 14 may engage a fixed abutment, as at 3$^a$, Fig. I, thus positively freeing the thimble from its socket in plunger 4.

The forming thimble 12 and its use in the manner indicated, are therefore important elements of the invention, since the thimble remains in position on the formed tube during hardening, to preserve its shape, and also permitting the formed tube to be quickly removed from the press, and immediate reuse of the press for another shaping operation; whereas in previous practice, as when the inner surface of a heated forming element similar to plunger 4 is engaged directly with the heat plastic tube, after the forming action the plunger must remain in position while it and the formed tube cool sufficiently to permit separation, and this evidently involves great waste of heat and time, since the press is kept practically idle during the cooling or "setting" period.

The invention procedure as described also avoids deformation of the molded tube end by premature withdrawal of a forming plunger such as 4 from direct contact therewith.

Figs. VII and IX show differently shaped forming caps, the cap 12$^b$ of Fig. IX being adapted for the production of the article of Fig. VIII, which has a relatively long, tapered, closed end portion 22.

In some cases, it is desired to form the tube with a more-or-less externally rounded or tapered contour, but "open-ended", and to close the end opening with a plug of the same material as that of the tube: celluloid, in case of a celluloid tube. It is also desirable to produce a thickened tube wall at the formed end, and at the same time avoid a difficulty experienced in attempting to round off plain tubes, which results in a wall section of reduced thickness and a thin edge, at the end which is to be plugged. For the stated purposes, as shown in Fig. III, mandrel 11 has inserted in its upper end a plug 11$^a$, diametered to produce in the tube end a hole of proper size to receive the closure plug to be inserted therein. Mandrel 11 may also have a tapered, or other suitable formation below plug 11$^a$ to provide the desired internal tube-form and upper tube wall section. Forming thimble 12 has in this case a hole 12$^a$ in its top, diametered to fit with close clearance about plug 11$^a$. The plug may have a slight "draft" (upward taper) to facilitate withdrawal from the completed tube. The method or operation is as above, except that as the end of plug 11$^a$ approaches hole 12$^a$ of the thimble, the material of the tube assumes completed form, the wall section being as shown in Fig. III, and then the end of the plug enters the hole, completing the open end formation of the tube.

After ejection and hardening as above described, the tube end may be trimmed or finished as desired, and the closure plug inserted.

Evidently the forming caps and other parts of the apparatus may be varied for the production of variously shaped articles, with or without closed ends, a principal feature of the invention consisting in the heating of only a portion of a heat-plastic article or tube to render it moldable, molding it without possibility of deformation of the remainder of the article, and in the use of a forming thimble which remains upon the article and preserves its shape while "setting", and also permits quick removal of the article from the press.

I claim:

1. A method of molding or pressing a heat-plastic article, comprising heating only a portion of the article to render it plastic, and while plastic, pressing it to desired altered shape by application of a forming thimble, relieving the forming pressure, retaining the thimble on the article until the material thereof has set, and removing the thimble from the article.

2. A method of pressing or shaping a tube of heat-plastic material, comprising applying pressure and applying and maintaining heat through a forming thimble to cause the material to flow and produce a substantially closed end formation.

3. A method of molding or pressing a heat-plastic article, comprising applying a hollow member about one end portion of the article, and applying an interposed forming device to such end portion, applying pressure and applying and maintaining heat to cause the material to flow and assume a desired form.

4. A method of pressing or shaping a tube of heat-plastic material, comprising placing the tube upon a mandrel, applying a hollow member about one end portion of the tube, and applying an interposed forming device to such end portion, applying pressure and applying and maintaining heat to cause the material to flow and assume a desired form.

5. Shaping or pressing apparatus for purposes described, comprising an article support, a heating element movable into position to heat said article, and means for shaping the heated portion of the article, said means including a forming thimble.

6. Shaping or pressing apparatus for purposes described, comprising an article support, a heating element movable into position to heat said article, and means for shaping the heated portion of the article, said means including a separable forming cap within said heating element.

7. Shaping or pressing apparatus for purposes described, comprising a base, a mandrel thereon for supporting a tubular heat-plastic article, a substantially hollow plunger movable to position about an end portion of the article, means for heating the plunger, and a forming cap removably located within the plunger.

8. Shaping or pressing apparatus for purposes described, comprising a base, a mandrel thereon for supporting a tubular heat-plastic article, a substantially hollow plunger movable to position about an end portion of the article, means for heating the plunger, and a forming cap removably located within the plunger, and an ejecting plunger movable within the hollow plunger to engage the forming cap.

9. Shaping or pressing apparatus for purposes described, comprising a base, a mandrel thereon for supporting a tubular heat-plastic article, a substantially hollow plunger movable to position about an end portion of the article, means for heating the plunger, and a forming cap removably located within the plunger, the heating means consisting of an electric heating coil externally located on the hollow plunger.

10. Shaping or pressing apparatus for purposes described, comprising a base, a mandrel thereon for supporting a tubular heat-plastic article, a substantially hollow plunger movable to position about an end portion of the article, means for heating the plunger, and a forming cap removably located within the plunger, and a plug in the upper end of the mandrel.

11. Shaping or pressing apparatus for purposes described, comprising a base, a mandrel thereon for supporting a tubular heat-plastic article, a substantially hollow plunger movable to position about an end portion of the article, means for heating the plunger, and a forming cap removably located within the plunger, and a plug in the upper end of the mandrel, the forming cap having an end aperture to accommodate the plug whereby to produce an open ended tube formation.

12. The combination with a press including a mandrel, and a heating plunger, of a forming thimble removably located in the heating plunger.

13. The combination with a press including a mandrel, and a heating plunger, of a forming thimble removably located in the heating plunger, the thimble having a top opening.

14. The combination with a press including a mandrel, and a heating plunger, of a forming thimble removably located in the heating plunger, and an ejector within the plunger to act upon the thimble.

15. The combination with a press including a mandrel, and a heating plunger, of a forming thimble removably located in and held by frictional contact with the heating plunger, and a plug at the top of the mandrel, the thimble having a top opening to receive the plug.

16. The combination with a press including a mandrel, and a heating plunger, of a forming thimble removably located in the heating plunger, the thimble having a top opening, and an ejector within the plunger to act upon the thimble.

17. The combination with a press including a mandrel, and a heating plunger, of a forming thimble removably located in the heating plunger, and a plug at the top of the mandrel, the thimble having a top opening to receive the plug, and an ejector within the plunger to act upon the thimble.

18. A method of pressing or shaping a tube of heat plastic material comprising applying pressure and applying and maintaining heat through a forming thimble to cause the material of the tube to flow and produce a substantially closed end formation, relieving the pressure and the heat, retaining the thimble on the article until the material thereof has set, and removing the thimble from the article.

19. The method of closing one end of a tube formed of cured pyroxylin compound which comprises softening one end of the tube, and in a single operation compressing the softened end between a mandrel, and a die having a socket shaped to correspond to the desired external shape of the finished cap.

20. The method of closing one end of a tube formed of cured pyroxylin compound which comprises softening one end of the tube, and in a single operation compressing the softened end between a mandrel and a die having a socket shaped to correspond to the external shape of the finished cap, and simultaneously forcing surplus material of the softened tube through a vent in the die.

JOHN N. WHITEHOUSE.